US009454693B2

(12) United States Patent
Aoki

(10) Patent No.: US 9,454,693 B2
(45) Date of Patent: Sep. 27, 2016

(54) IMAGE CORRECTION APPARATUS, IMAGE CORRECTION METHOD, AND BIOMETRIC AUTHENTICATION APPARATUS

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 14/195,301

(22) Filed: Mar. 3, 2014

(65) Prior Publication Data
US 2014/0294250 A1    Oct. 2, 2014

(30) Foreign Application Priority Data

Mar. 28, 2013    (JP) .................................. 2013-068659

(51) Int. Cl.
| G06K 9/20 | (2006.01) |
| G06K 9/36 | (2006.01) |
| G06K 9/00 | (2006.01) |
| H04N 5/243 | (2006.01) |
| H04N 5/33 | (2006.01) |

(Continued)

(52) U.S. Cl.
CPC ........... *G06K 9/00362* (2013.01); *G06F 21/32* (2013.01); *G06K 9/00033* (2013.01); *G06K 9/2018* (2013.01); *G06T 5/001* (2013.01); *H04N 1/60* (2013.01); *H04N 5/243* (2013.01); *H04N 5/33* (2013.01); *G06K 2009/00932* (2013.01)

(58) Field of Classification Search
CPC .... H04N 5/2178; H04N 9/045; H04N 9/735; G06T 5/002
See application file for complete search history.

(56) References Cited

U.S. PATENT DOCUMENTS

| 6,350,985 B1 | 2/2002 | Rodricks et al. |
| 2004/0246352 A1 | 12/2004 | Suzuki |

(Continued)

FOREIGN PATENT DOCUMENTS

| JP | 2001-285762 A | 10/2001 |
| JP | 2004-363902 | 12/2004 |

(Continued)

OTHER PUBLICATIONS

Extended European Search Report dated Sep. 1, 2014 for corresponding European Patent Application No. 14157205.7, 10 pages.

(Continued)

*Primary Examiner* — Brian P Werner
(74) *Attorney, Agent, or Firm* — Fujitsu Patent Center

(57) ABSTRACT

An image correction apparatus includes a correction factor calculating unit which calculates a correction factor such that a distance between a corrected value obtained by correcting, using the correction factor, a luminance value of a first pixel on the image corresponding to a sensor element with a first filter in an image sensor included in an image capturing unit which generates the image, the first filter having a first transmittance characteristic and a luminance value of a second pixel on the image corresponding to a sensor element with a second filter in the image sensor, the second filter having a second transmittance characteristic, becomes smaller than a distance between the luminance value of the first pixel and the luminance value of the second pixel, and a correcting unit which generates a corrected image by correcting the luminance value of the first pixel using the correction factor.

12 Claims, 5 Drawing Sheets

(51) Int. Cl.
*G06F 21/32* (2013.01)
*G06T 5/00* (2006.01)
*H04N 1/60* (2006.01)

(56) References Cited

U.S. PATENT DOCUMENTS

| | | |
|---|---|---|
| 2005/0143652 A1 | 6/2005 | Sato |
| 2005/0248671 A1* | 11/2005 | Schweng ............... H04N 9/045 348/246 |
| 2007/0273658 A1* | 11/2007 | Yli-Nokari ......... G06F 3/03547 345/173 |
| 2009/0065679 A1 | 3/2009 | Tanimoto |
| 2009/0122166 A1* | 5/2009 | Suzuki ................... H04N 9/045 348/242 |
| 2009/0154826 A1* | 6/2009 | Park ........................ G06T 5/002 382/260 |
| 2012/0105688 A1 | 5/2012 | Kita |
| 2012/0114195 A1 | 5/2012 | Matsuda et al. |

FOREIGN PATENT DOCUMENTS

| | | |
|---|---|---|
| JP | 2005-191748 | 7/2005 |
| JP | 2007-249615 A | 9/2007 |
| JP | 2009-66121 A | 4/2009 |
| JP | 2012-95061 A | 5/2012 |
| JP | 2013-51592 A | 3/2013 |
| KR | 10-2012-0049121 A | 5/2012 |
| WO | 00/65374 A1 | 11/2000 |
| WO | 2006/137216 A1 | 12/2006 |

OTHER PUBLICATIONS

European Office Action dated Aug. 10, 2015 for corresponding European Patent Application No. 14157205.7, 4 pages.
Anonymous: "Photoshop Help/Adjust color and tone with Levels and Curves eyedroppers", Jan. 3, 2013, XP055115575, Retrieved from the Internet: Section "Color correct using the eyedroppers", URL:https://web.archive.org/wet/20130103015416/http:/helpx.adobe.com/photoshop/using/adjust-color-tone-levels-curves.html [retrieved on Apr. 28, 2014], 2 pages.
Harte, John, "John Harte's Digital Infrared Photography Blog", Nov. 25, 2010, XP055115567, Retrieved from the Internet: URL: http://digitalir.wordpress.com/2010/11/25/the-importance-of-ir-white-balance/ [retrieved on Apr. 28, 2014], 3 pages.
Partial European Search Report for corresponding European Application No. 14157205.7 dated May 9, 2014, 6 pages.
Korean Office Action mailed Mar. 2, 2016 for corresponding Korean Patent Application No. 10-2014-0034708 with English Translation, 16 pages.
Chinese Office Action dated May 13, 2016 for corresponding Chinese Patent Application No. 201410119289.9, with English Translation, 21 pages.
Japanese Office Action mailed Aug. 9, 2016 for corresponding Japanese Patent Application No. 2013-068659, with Partial English Translation, 6 pages.

* cited by examiner

500

IMAGE CORRECTION APPARATUS, IMAGE CORRECTION METHOD, AND BIOMETRIC AUTHENTICATION APPARATUS

CROSS-REFERENCE TO RELATED APPLICATION

This application is based upon and claims the benefit of priority of the prior Japanese Patent Application No. 2013-068659, filed on Mar. 28, 2013, and the entire contents of which are incorporated herein by reference.

FIELD

The embodiments discussed herein are related to an image correction apparatus and an image correction method that corrects a value of each pixel in an image, and a biometric authentication apparatus that utilizes such an image correction apparatus or an image correction method.

BACKGROUND

In recent years, a biometric authentication technique has been developed in which a user of an apparatus or a system is authenticated based on a biometric image representing biometric information such as a vein pattern of a hand or a finger, a fingerprint, or a palm print. In a biometric authentication apparatus utilizing such a biometric authentication technique, for example, a biometric information capturing apparatus acquires a biometric image representing biometric information by capturing a body part including the biometric information of a user intending to use the biometric authentication apparatus. The biometric authentication apparatus matches the input biometric information which is the biometric information of the user represented in the biometric image, to registered biometric information which is biometric information represented in biometric image of a registered user registered in advance. When the input biometric information and the registered biometric information are determined to be in coincidence based on a result of a matching process, the biometric authentication apparatus authenticates the user as the registered user having a valid authority. The biometric authentication apparatus allows the authenticated user to use an apparatus in which the biometric authentication apparatus is incorporated or other apparatus connected to the biometric authentication apparatus.

When biometric information is a vein pattern of a palm or a finger, a light emitting element emitting near-infrared light such as an infrared LED is used as an illumination light source for allowing the illumination light to reach into the inside of a hand or a finger. In order to generate an image in which a vein pattern is captured by detecting illumination light reflected or scattered by a hand or a finger, which is an object to be captured, or transmitted through the object to be captured, a biometric information image capturing apparatus uses an image sensor in which sensor elements having sensitivity to near-infrared light are arranged in two dimensions. As the sensor elements, a solid-state image capturing element such as a charge-coupled device (CCD) or a Complementary Metal Oxide Semiconductor (CMOS) are utilized, for example.

However, an image sensor for near-infrared light is generally more expensive than an image sensor for visible light since the image sensor for near-infrared light is used in special applications and is not mass-produced. Although a CCD and a CMOS are image sensors for visible light, the CCD and CMOS also have sensitivity to near-infrared light. Thus, if an image sensor for visible light can be used for capturing a vein pattern, it is possible to reduce the cost of a biometric information image capturing apparatus. However, since a CCD and a CMOS do not have a function for identifying color, the image sensor for visible light, a color image sensor in particular, generally include, for each sensor element, a color filter which a light of a specific wavelength passes through. For example, sensor elements of two columns by two rows are formed as one set, and filters which a light of a wavelength corresponding to green passes through are arranged at two sensor elements along one of the diagonal lines. At the other two sensor elements, a filter through which a light of wavelength corresponding to red passes and a filter through which a light of wavelength corresponding to blue passes are respectively arranged. Such an array of filters is referred to as a Bayer array.

An image capturing apparatus is proposed in which one filter for green among filters in which such four sensor elements are grouped into a set is replaced with a filter for near-infrared light and an inside of a human body is an object to be captured, the human body being illuminated with near-infrared light (for example, Japanese Laid-open Patent Publication No. 2005-191748).

SUMMARY

However, in the technology described in Japanese Laid-open Patent Publication No. 2005-191748, when an inside of a human body, for example a blood vessel, is an object to be captured, an image is generated using signals obtained from sensor elements with filters for near-infrared light. Signals obtained from sensor elements with filters for visual light are not used. Therefore, the resolution of the image in which the inside of the human body is captured ends up being lower than that of the image sensor itself.

Color filters also pass near-infrared light therethrough. However, transmittance for near-infrared light varies depending on filters. Accordingly, when signals obtained from pixels corresponding to sensor elements with color filters are used for generating an image of an object to be captured which is illuminated by near-infrared light, a filter pattern results in appearing on the image. When the filter pattern and the object to be captured are superimposed on an image, a point at which changes of luminance due to the filter pattern may be misdetected as a feature point in extraction of the feature point of an object to be captured from the image by a biometric authentication apparatus. Thus, it is not preferable that a filter pattern appear on an image. In addition, since color filters are generally incorporated in an image sensor body, it is difficult to remove the color filters from the image sensor.

According to one embodiment, an image correction apparatus is provided. The image correction apparatus includes a correction factor calculating unit which calculates a correction factor such that a distance between a corrected value obtained by correcting, using the correction factor, a luminance value of a first pixel on an image corresponding to a sensor element with a first filter in an image sensor included in an image capturing unit which generates the image, the first filter having a first transmittance characteristic and a luminance value of a second pixel on the image corresponding to a sensor element with a second filter in the image sensor, the second filter having a second transmittance characteristic different from the first transmittance characteristic, becomes smaller than a distance between the luminance value of the first pixel and the luminance value of the second pixel, and a correcting unit which generates a corrected image by correcting the luminance value of the first pixel using the correction factor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, with reference to the drawings, an image correction apparatus according to an embodiment and a biometric authentication apparatus including such an image correction apparatus are explained. The image correction apparatus corrects a biometric image so as to cancel out a filter pattern appearing on the biometric image representing the biometric information, the biometric image being generated by illuminating near-infrared light to a body part which includes biometric information and capturing the body part by an image sensor with color filters. For this purpose, based on a difference between luminance values of adjacent pixels corresponding to sensor elements with filters having different transmittance characteristics from each other, the image correction apparatus obtains a correction factor which minimizes the difference. Then the image correction apparatus corrects, using the correction factor, a luminance value of a pixel corresponding to a sensor element with a filter having either of the transmittance characteristics.

In the present embodiment, the biometric information is a vein pattern of a palm. However, the biometric information may be biometric information other than a vein pattern of a palm, for example, a vein pattern of a finger, that is able to be captured through illuminating with near-infrared light.

Figure 1:
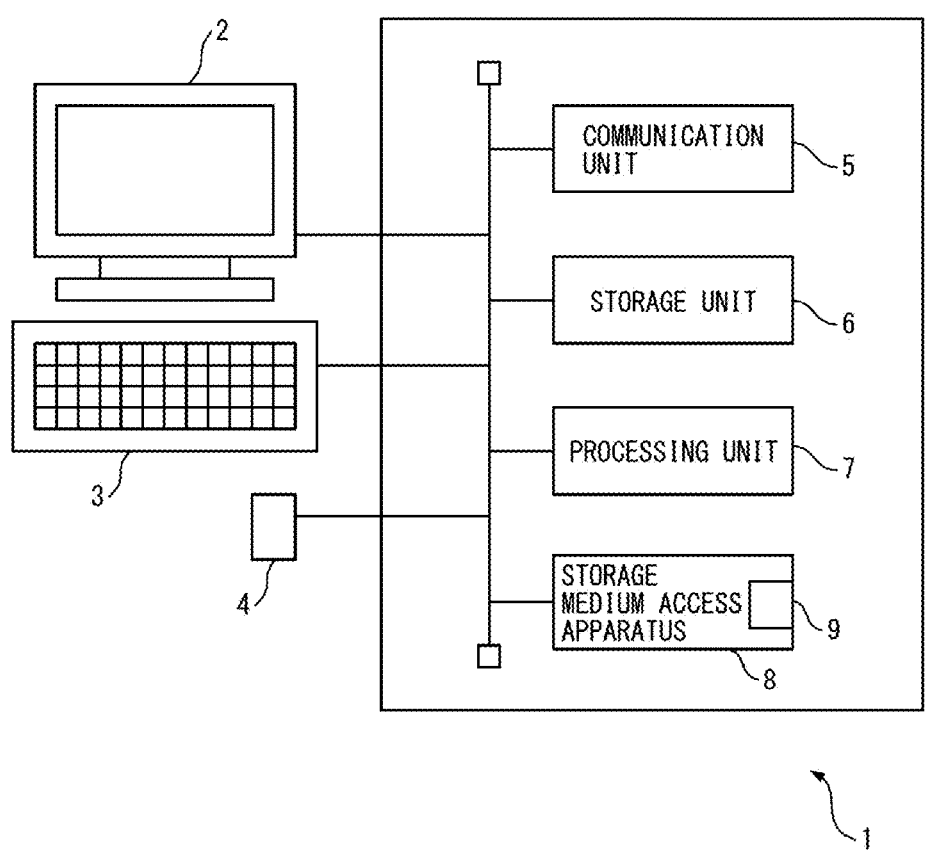
FIG. 1 is a schematic configuration diagram of a biometric authentication apparatus incorporating an image correction apparatus according to an embodiment.

FIG. 1 is a schematic configuration diagram of a biometric authentication apparatus incorporating an image correction apparatus according to an embodiment. As illustrated in FIG. 1, a biometric authentication apparatus 1 includes a display unit 2, an input unit 3, a biometric information image capturing apparatus 4, a communication unit 5, a storage unit 6, and a processing unit 7. The display unit 2, the input unit 3, and the biometric information image capturing apparatus 4 may be arranged separately from a housing accommodating the communication unit 5, the storage unit 6, and the processing unit 7. Alternatively, the display unit 2, the input unit 3, the biometric information image capturing apparatus 4, the communication unit 5, the storage unit 6, and the processing unit 7 may be accommodated in a single housing like a so-called notebook type personal computer or tablet type terminal.

The biometric authentication apparatus 1 performs an image correction process on a biometric image representing a vein pattern of a palm of a user generated by the biometric information image capturing apparatus 4. The image correction process corrects luminance unevenness due to a color filter of an image sensor included in the biometric information image capturing apparatus 4. The biometric authentication apparatus 1 performs a biometric authentication process using the biometric image on which the image correction process has been performed. When the user is authenticated to be any of registered users as a result of the biometric authentication process, the biometric authentication apparatus 1 allows the user to use a computer in which the biometric authentication apparatus 1 is incorporated. Alternatively, by transmitting a signal that the user has been authenticated to other apparatus (not illustrated) via the communication unit 5, the biometric authentication apparatus 1 allows the user to use the other apparatus.

The biometric authentication apparatus 1 may further include a storage medium access apparatus 8 for accessing a storage medium 9 such as a magnetic disc, a semiconductor memory card, or an optical storage medium. The biometric authentication apparatus 1 reads a computer program for the biometric authentication including the image correction process, for example, via the storage medium access apparatus 8, which is stored in the storage medium 9 and is executed on the processing unit 7. According to the computer program, the processing unit 7 may correct the biometric image generated by the biometric information image capturing apparatus 4 and perform the biometric authentication process based on the corrected biometric image.

The display unit 2 includes a display apparatus such as, for example, a liquid crystal display. The display unit 2 displays for the user, for example, a message indicating a body part (the right hand or the left hand) for use in matching or a guidance message to guide the hand to a position at which the biometric information image capturing apparatus 4 can obtain a suitable biometric image. Furthermore, the display unit 2 displays various kinds of information and the like related to applications executed by the processing unit 7.

The input unit 3 includes, for example, a keyboard and a pointing device such as a mouse. Commands, data, and a user name or a user identification number of a user input by the user via the input unit 3 are passed to the processing unit 7.

Figure 2:
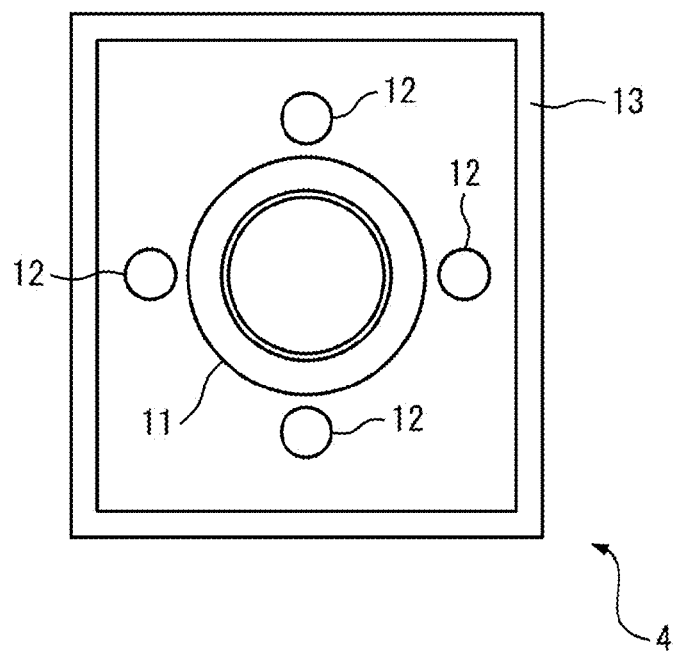
FIG. 2 is a schematic plan view of a biometric information image capturing apparatus included in the biometric authentication apparatus.

The biometric information image capturing apparatus 4 generates a biometric image representing a vein pattern of a palm of a user. FIG. 2 is a schematic plan view of the biometric information image capturing apparatus 4. The biometric information image capturing apparatus 4 includes an image capturing unit 11 and a plurality of light sources 12 for emitting near-infrared light. The image capturing unit 11 and each of the light sources 12 are accommodated in a cuboid shaped housing 13 with an upper end open. Note that side walls of the housing 13 may be a guide for placing a hand. Alternatively, a guide for placing a hand may be provided near the opening of the housing 13, separately from the housing 13. In addition, a plate-like transparent glass or transparent plastic for protecting the image capturing unit 11 and each of the light sources 12 may be provided at the upper end of the housing 13.

The biometric information image capturing apparatus 4 illuminates, with light from each of the light sources 12, the hand placed near the opening of the housing 13 above the biometric information image capturing apparatus 4 so as to face the image capture unit 11 and the light sources 12. The image capturing unit 11 generates a biometric image representing a vein pattern of the palm by capturing the illuminated hand.

The image capturing unit 11 is placed at the bottom of the housing 13 such that the sensor surface thereof faces upward. The image capturing unit 11 includes an image sensor (not illustrated) in which sensor elements sensitive to near-infrared light are arranged in two dimensions, and an imaging optical system (not illustrated) which forms an image within an image capturing range on the image sensor. The entire opening of the upper end of the housing 13 is made to be the image capturing range. Note that each sensor element is, for example, a CCD or a CMOS. When a control signal instructing to capture an image is received from the processing unit 7 with the hand being placed near the opening of the upper end of the housing 13, the image capturing unit 11 generates a biometric image representing a vein pattern of the palm and outputs the biometric image to the processing unit 7.

Each of the plurality of light sources 12 is arranged around the image capturing unit 11 with the emitting surface facing upward in order to illuminate the image capturing range of the image capturing unit 11. In the present embodiment, each of the light sources 12 may be a light emitting element emitting infrared light such as an infrared light emitting diode so that the light from each of the light sources 12 reaches into the inside of the hand.

In the present embodiment, each of the light sources 12 is illuminated all the time while an image of a vein pattern of a palm is being captured.

The communication unit 5 includes a communication interface circuit for connecting the biometric authentication apparatus 1 to a communication network (not illustrated). The communication unit 5 transmits a usage permission or an authentication result of a user received from the processing unit 7 to other apparatus via the communication network.

The storage unit 6 includes, for example, a non-volatile semiconductor memory and a volatile semiconductor memory. The storage unit 6 stores an application program used in the biometric authentication apparatus 1, a user name, a user identification number and individual setting information of at least one registered user, various types of data, and the like. In addition, the storage unit 6 stores a program for performing the image correction process and the biometric authentication process. Furthermore, the storage unit 6 stores, for each registered user, matching data representing a feature of a vein pattern of a palm of either the left hand or the right hand which is registered biometric information of the registered user. The matching data includes, for example, a position or a type of a feature point representing a characteristic structure such as an ending or a bifurcation of a vein extracted from the authentication image generated at the time of registering the registered user or updating the matching data. Alternatively, the matching data may be the biometric image itself or a part thereof generated at the time of registering the registered user or updating matching data.

The processing unit 7 is an example of the image correction apparatus and includes one or a plurality of processors and a peripheral circuit thereof. The processing unit 7 performs an image correction process on the biometric image obtained from the biometric information image capturing apparatus 4 and representing the biometric information of the user of the apparatus, and also performs a biometric authentication process using the corrected biometric image.

Figure 3:
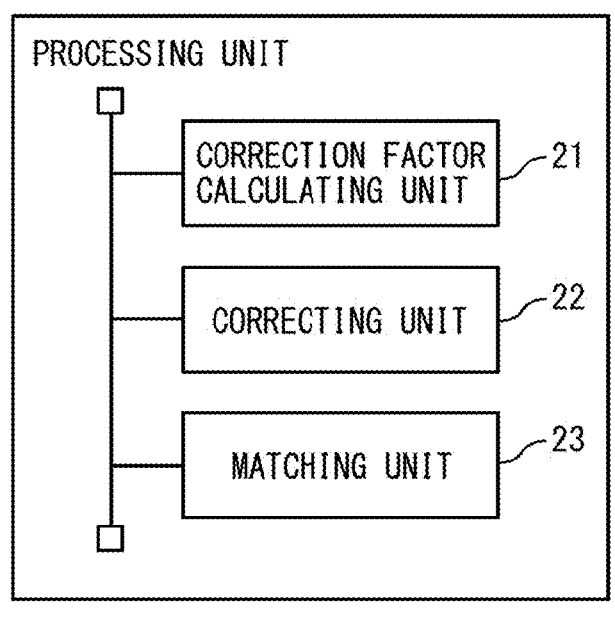
FIG. 3 is a functional block diagram of a processing unit.

FIG. 3 is a functional block diagram of the processing unit 7. The processing unit 7 includes a correction factor calculating unit 21, a correcting unit 22, and a matching unit 23. The correction factor calculating unit 21, the correcting unit 22, and the matching unit 23 are, for example, functional modules which are implemented by computer programs operating on the processor included in the processing unit 7.

Every time a biometric image is obtained, the correction factor calculating unit 21 and the correcting unit 22 each are performed as a part of the image correction process on the biometric image. Meanwhile, the matching unit 23 is performed in the biometric authentication process.

The correction factor calculating unit 21 calculates a correction factor for correcting a luminance value of a first pixel on the biometric image corresponding to a sensor element with a filter of a specific color, based on the luminance value of the first pixel and a luminance value of a second pixel corresponding to a sensor element with a filter of other color. Specifically, the correction factor calculating unit 21 calculates the correction factor such that a distance between a corrected value obtained by correcting the luminance value of the first pixel using the correction factor and the luminance value of the second pixel becomes less than a distance between the luminance value of the first pixel and the luminance value of the second pixel. Note that the correction factor calculating unit 21 calculates a distance between two luminance values using an absolute value of a difference of the two luminance values in the present embodiment, however, it is not limited thereto, and a distance between the two luminance values may be calculated using another indicator of a distance such as a Euclidean distance of the two luminance values.

Figure 4:
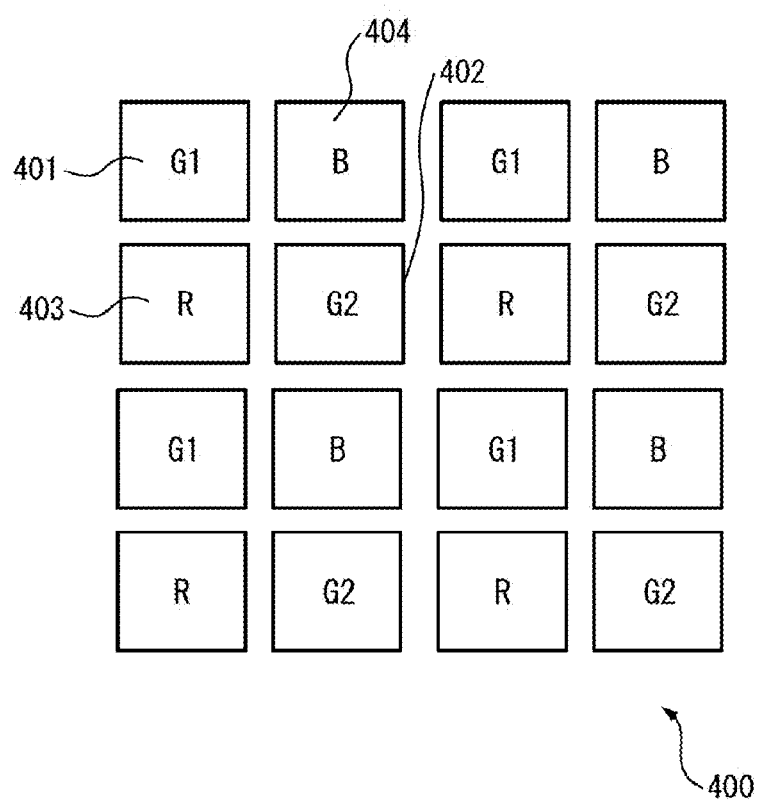
FIG. 4 is a diagram depicting a Bayer array.

In the present embodiment, the image sensor included in the image capturing unit 11 of the biometric information image capturing apparatus 4 includes color filters. FIG. 4 is a diagram depicting color filters 400 arranged according to a Bayer array. In FIG. 4, each block represents one sensor element of the image sensor. Each sensor element denoted by "G1" and "G2" such as a sensor element 401 and a sensor element 402 includes a filter which passes light of a wavelength corresponding to a green color. Each sensor element denoted by "R" such as a sensor element 403 includes a filter which passes light of a wavelength corresponding to a red color. In addition, each sensor element denoted by "B" such as a sensor element 404 includes a filter which passes light of a wavelength corresponding to a blue color. As mentioned above, transmittances for near-infrared light of the filter which passes light of a wavelength corresponding to a green color, the filter which passes light of a wavelength corresponding to a red color, and the filter which passes light of a wavelength corresponding to a blue color are different from each other. In other words, transmittance characteristics of respective filters are different from each other. Hereinafter, for convenience of explanation, the filter which passes light of a wavelength corresponding to a red color is referred to as an R filter. Similarly, the filter which passes light of a wavelength corresponding to a green color is referred to as a G filter and the filter which passes light of a wavelength corresponding to a blue color is referred to as a B filter.

Figure 5:
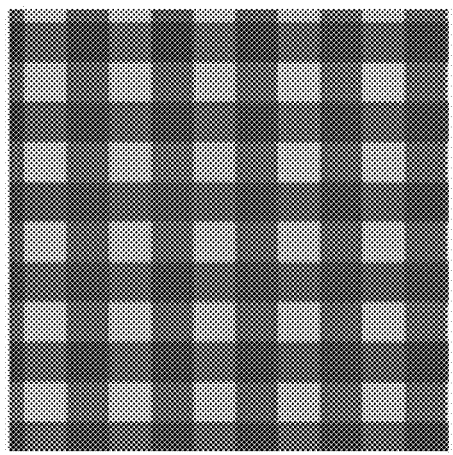
FIG. 5 is an exemplary diagram obtained by illuminating a uniform object with near-infrared light and capturing the object through an image capturing unit of the biometric information image capturing apparatus.

FIG. 5 is an exemplary diagram of an image obtained by illuminating a uniform object with near-infrared light and capturing the object through the image capturing unit 11. Since transmittances of respective filters for near-infrared light are different from each other, a lattice-like pattern corresponding to the Bayer array is to appear on the image as illustrated in an image 500 when color filters of the Bayer array are provided on the image sensor of the image capturing unit 11.

Since the same filter is used for each color for the entire image sensor of the image capturing unit 11, differences in transmittance for near-infrared light due to differences of the filters are considered to be constant throughout the entire image generated by the biometric information image capturing apparatus 4. Accordingly, in an image in which an object being uniform for near-infrared light is captured, a value obtained by multiplying, by a constant, a luminance value of a pixel corresponding to a sensor element with a filter of any color may be equal to a luminance value of a pixel corresponding to a sensor element with a filer of other color.

There are few places throughout the entire biometric image where structure of a body part including biometric information change significantly among adjacent pixels. Therefore, the correction factor calculating unit 21 determines a correction factor by which luminance values of pixels corresponding to sensor elements with any filter are multiplied such that luminance differences between adjacent pixels corresponding to sensor elements with different filters are minimized throughout the entire biometric image. By correcting the luminance value of one of the adjacent pixels using the correction factor, an absolute value of the luminance difference between the adjacent pixels becomes smaller than an absolute value of a luminance difference between the adjacent pixels due to a difference in transmittance of the filters.

In the present embodiment, the correction factor calculating unit 21 calculates a correction factor according to the least square method for each of the R filter and the B filter such that an evaluation value $E(\alpha)$ obtained from the following equation becomes minimum:

$$E(\alpha) = \sum_{i=1}^{N} (\alpha \cdot x_{1,i} - x_{2,i})^2 \quad \text{(where } \alpha = \alpha_R \text{ or } \alpha_B\text{)} \tag{1}$$

where $\alpha_R$ is a correction factor to be applied to a pixel corresponding to a sensor element with the R filter, and $\alpha_B$ is a correction factor to be applied to a pixel corresponding to a sensor element with the B filter. In calculating the correction factor $\alpha_R$, $x_{1,i}$ in the equation (1) is a luminance value of a pixel corresponding to a sensor element with the R filter in order of, for example, raster scan. Value $x_{2,i}$ is a luminance value of a pixel corresponding to a sensor element with the G filter adjacent to the pixel corresponding to the sensor element with the R filter. Note that an order of pixels in the equation (1) may be a sequence other than the raster scan order. Since filters "G1" and "G2" illustrated in FIG. 4 generally have the same wavelength transmittance characteristic, a pixel adjacent to a pixel corresponding to a sensor element with the R filter may be either a pixel corresponding to "G1" or a pixel corresponding to "G2". Similarly, in calculating the correction factor $\alpha_B$, $x_{1,i}$ is a luminance value of a pixel corresponding to a sensor element with the B filter and $x_{2,i}$ is a luminance value of a pixel corresponding to a sensor element with the G filter adjacent to the pixel corresponding to the sensor element with the B filter. Note that N is a total number of sensor elements with the R filter or a total number of sensor elements with the B filter, included in the entire image sensor.

The correction factor calculating unit 21 can calculate the correction factor $\alpha$ which minimizes the evaluation value $E(\alpha)$ according to the following equation, by partially differentiating the equation (1) by the correction factor $\alpha$ for each of the R filter and the B filter.

$$\alpha = \frac{\sum_{i=1}^{N} x_{1,i} \cdot x_{2,i}}{\sum_{i=1}^{N} x_{1,i}^2} \quad \text{(where } \alpha = \alpha_R \text{ or } \alpha_B\text{)} \tag{2}$$

Note that the correction factor calculating unit 21 may calculate a correction factor of a pixel corresponding to a sensor element with the G filter instead of calculating a correction factor of a pixel corresponding to a sensor element with the R filter or a pixel corresponding to a sensor element with the B filter. Note, however, that in the Bayer array, the number of sensor elements with the R filter and the number of sensor elements with the B filter are a half of the number of sensor elements with the G filter. Thus, the correction factor calculating unit 21 calculates a correction factor for pixels corresponding to sensor elements with the R filter or the B filter. By correcting luminance values of those pixels with the correcting unit 22, it is possible to reduce an amount of operations compared to the case of correcting luminance values of pixels corresponding to sensor elements with the G filter.

The correction factor calculating unit 21 passes, to the correcting unit 22, the correction factors $\alpha_R$ for the R filter and $\alpha_B$ for the B filter.

The correcting unit 22 corrects the biometric image using the correction factors $\alpha_R$ and $\alpha_B$. For such correction, for each pixel corresponding to a sensor element with the R filter, the correcting unit 22 multiplies the luminance value of the pixel by the correction factor $\alpha_R$. Similarly, for each pixel corresponding to a sensor element with the B filter, the correcting unit 22 multiplies the luminance value of the pixel by the correction factor $\alpha_B$. Thereby, a corrected biometric image is generated in which transmittance differences for near-infrared light among filters are compensated.

The correcting unit 22 stores the corrected biometric image in the storage unit 6.

The matching unit 23 reads the corrected biometric image from the storage unit 6 and determines whether or not to authenticate a user based on the corrected biometric image.

The matching unit 23 generates, from the corrected biometric image, matching data representing a feature of biometric information captured on the corrected biometric image. For example, when the biometric authentication apparatus 1 performs a matching process using a minutiae matching, the matching unit 23 extracts a feature point used in the minutiae matching from the corrected biometric image. The matching unit 23 sets the position of the feature point or the type of the feature point as matching data.

For this reason, the matching unit 23 distinguishes between an object area where a body part including the biometric information is captured on the corrected biometric image and a background area where the body part is not captured. In the present embodiment, luminance values of pixels where the body part including the biometric information is captured are greater than luminance values of pixels where the body part including the biometric information is not captured. Accordingly, the matching unit 23 binarizes the corrected biometric image such that, for example, a group of pixels having luminance values greater than or equal to an object determination threshold value is set as the object area and a group of pixels having luminance values less than the object determination threshold value is set as the background area. The object determination threshold value is, for example, set to a predetermined fixed value (for example, 150) or the average value of luminance values of respective pixels in the corrected biometric image.

In addition, within the object area, the matching unit 23 distinguishes between a vein area which is a group of pixels where a vein is captured and a non-vein area which is a group of pixels where a vein is not captured. In the present embodiment, luminance values of pixels where a vein is captured are less than luminance values where a vein is not captured. Accordingly, the matching unit 23 binarizes the object area such that, for example, a group of pixels having luminance values less than or equal to a vein determination threshold value is set to the vein area and a group of pixels having luminance values greater than the vein determination threshold value is set to the non-vein area. The vein determination threshold value is set to a predetermined fixed value (for example, 200) or the average value of luminance values of respective pixels in the object area.

Then, the matching unit 23 performs, for example, a thinning process on a group of pixels having luminance values corresponding to a vein in the binarized object area to generate a binarized thinning image in which the vein is thinned. Then, by scanning the binarized thinning image using a plurality of templates corresponding to any vein bifurcations or endings, the matching unit 23 detects a position in the binarized thinning image, where any of the templates matches the binarized thinning image. The matching unit 23 extracts the center pixel of the detected position as a feature point.

Note that the matching unit 23 may extract a feature point from the corrected biometric image using other known method for obtaining an ending and bifurcation of a vein as a feature point. Furthermore, the matching unit 23 may obtain other feature amount representing a feature of a vein pattern in the corrected biometric image as matching data. For example, the matching unit 23 may divide the object area into a plurality of blocks to obtain the number of veins for each block as matching data.

When the biometric authentication apparatus 1 performs a matching process using a pattern matching, the matching unit 23 may set the corrected biometric image itself as matching data or set a circumscribed rectangular area or an inscribed rectangular area of the object area trimmed from the corrected biometric image as matching data.

The matching unit 23 receives a user name or a user identification number from the input unit 3. The matching unit 23 reads, from the storage unit 6, matching data of the registered user corresponding to the user name or user identification number. Then the matching unit 23 matches the matching data of the user and the matching data of the registered user. The matching unit 23 calculates a degree of similarity between the biometric information of the user and the biometric information of the registered user as a result of the matching process.

When using the minutiae matching, the matching unit 23 obtains the number of feature points with respect to vein patterns which match between feature points included in the matching data of the registered user and feature points included in the matching data of the user. The matching unit 23 calculates the degree of similarity by dividing the number of the matched feature points by the number of feature points extracted with respect to the vein pattern of the user. Alternatively, when using the pattern matching, the matching unit 23 calculates normalized cross-correlation values, changing a relative position between the biometric image of the user and a biometric image in which a vein pattern of the registered user is captured. The matching unit 23 sets the maximum value of the normalized cross-correlation values as the degree of similarity.

The matching unit 23 determines that the biometric information of the user and the biometric information of the registered user to be matched are matched when the degree of similarity is greater than or equal to a threshold value for authentication. The matching unit 23 authenticates the user as the registered user.

When the degree of similarity is less than the threshold value for authentication, the matching unit 23 determines that the biometric information of the user and the biometric information of the registered user to be matched are not matched. In this case, the matching unit 23 does not authenticate the user. The processing unit 7 causes the display unit 2 to display authentication result information representing an authentication result.

It is preferable that the threshold value for authentication is set to a value such that the matching unit 23 succeeds in authentication only when a registered user himself/herself is the user. It is preferable that the threshold value for authentication is set to a value such that the matching unit 23 fails in authentication when a person different from the registered user is the user. For example, the threshold value for authentication may be a value obtained by adding, to the minimum value of the degree of similarity, a value obtained by multiplying, by 0.7, a difference of a maximum value and a minimum value which the degree of similarity can take.

Figure 6:
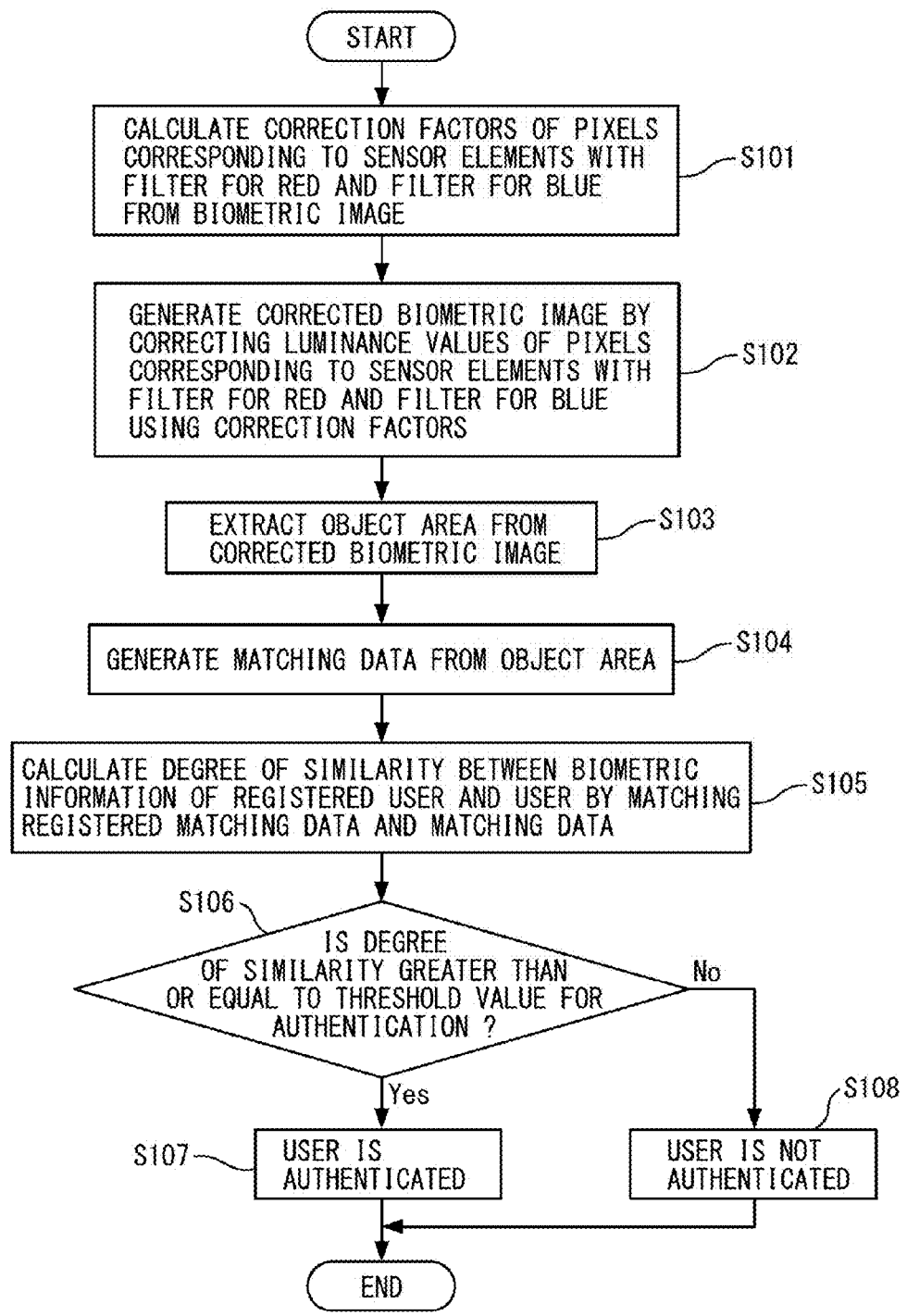
FIG. 6 is an operational flowchart of a biometric authentication process including an image correction process.

FIG. 6 is an operational flowchart of a biometric authentication process including an image correction process. The processing unit 7 performs the biometric authentication process every time a biometric image is received from the biometric information image capturing apparatus 4. Note that processes of step S101 and step S102 among the biometric authentication process correspond to the image correction process.

The correction factor calculating unit 21 calculates a correction factor of a pixel corresponding to a sensor element with the R filter and a correction factor of a pixel corresponding to a sensor element with the B filter (step S101). In this step, the correction factor calculating unit 21 calculates the correction factor such that a difference between a value obtained by multiplying, by the correction factor, a luminance value of a pixel corresponding to a sensor element with the R filter or the B filter and a luminance value of a pixel, located adjacent to that pixel and corresponding to a sensor element with the G filter becomes minimum.

With respect to pixels corresponding to each sensor element with a filter to be corrected, the correcting unit 22 corrects the luminance value of each of the pixels by multiplying the luminance value by the obtained corresponding correction factor. Thereby, the correcting unit 22 generates a corrected biometric image (step S102).

The matching unit 23 extracts an object area from the corrected biometric image (step S103). Then the matching unit 23 generates matching data representing a feature of biometric information from the object area (step S104). By matching the matching data of the user and matching data of a registered user identified by identification information received via the input unit 3, the matching unit 23 calculates a degree of similarity between the biometric information of the user and the biometric information of the registered user (step S105). Then the matching unit 23 determines whether or not the degree of similarity is greater than or equal to a threshold value for authentication (step S106).

When the degree of similarity is greater than or equal to the threshold value for authentication (Yes at step S106), the matching unit 23 authenticates the user as the registered user specified by the identification information (step S107). Meanwhile, when the degree of similarity is less than the threshold value for authentication (No at step S106), the matching unit 23 does not authenticate the user (step S108). The processing unit 7 terminates the biometric authentication process after step S107 or step S108.

As described above, even when an image sensor with color filters is used for generating a biometric image, the biometric authentication apparatus including the image correction apparatus can compensate luminance differences among pixels due to transmittance differences among filters for near-infrared light. Therefore, the biometric authentication apparatus can suppress patterns of the filters appearing on the biometric image. In this example, every time a biometric image is obtained from the biometric information image capturing apparatus, the biometric authentication apparatus calculates correction factors based on the biometric image and corrects the biometric image using the correction factors. Therefore, a calibration process for obtaining a correction factor in advance is not required. Furthermore, since correction factors are not required to be stored in advance, a capacity of non-volatile memory may be reduced. In addition, a transmittance for near-infrared light of a filter provided on each sensor element of an image sensor may vary according to environmental conditions, for example, temperature or humidity, at a time of a biometric image generation. Even in such a case, the biometric authentication apparatus according to the present embodiment calculates, every time a biometric image is obtained, correction factors based on the biometric image. Therefore, the biometric image can be properly corrected, even when filter characteristics change due to environmental conditions. Furthermore, by utilizing a biometric image with corrected luminance, the biometric authentication apparatus can suppress reduction in authentication accuracy due to an arrangement of filters having different transmittances for near-infrared light.

Note that a luminance value of each pixel in a background area may become very low since nothing is captured in the background area on a biometric image. In such a case, luminance values of such pixels with low luminance values are affected by other causes such as electrical noise rather than a filter transmittance. An area used by the biometric authentication process is the object area. Accordingly, the correction factor calculating unit 21 may extract the object area from the biometric image to calculate the correction factors $\alpha_R$ and $\alpha_B$ according to the equation (1) and the equation (2) with regard to only those pixels included in the object area. Thereby, the correction factor calculating unit 21 can determine the correction factors $\alpha_R$ and $\alpha_B$ more properly.

In addition, it is preferable that the correction factor calculating unit 21 does not utilize pixels, whose luminance values are saturated, for calculating the correction factor since differences in filter transmittances may not be properly presented. Accordingly, the correction factor calculating unit 21 may exclude, from the calculation of the correction factor, pixels having luminance values higher than a value obtained by subtracting a predetermined offset value (for example, 5 to 10) from a maximum value of luminance values which pixels can take (for example, 255).

When a luminance value difference between adjacent pixels is large, an edge of a structure in the captured object (for example, a border between a vein and a periphery thereof) may exist between the adjacent pixels. When such pixels are utilized for the calculation of the correction factor, the correction factor may not be properly calculated. Accordingly, the correction factor calculating unit 21 may also exclude, from the calculation of the correction factor, a pixel with an absolute value $|x_{1,j}-x_{2,j}|$ of a difference of luminance values between the adjacent pixels which is greater than or equal to a predetermined threshold value (for example, 20 to 50).

Furthermore, according to other modified example, the correcting unit 22 may extract an object area from a biometric image to correct luminance values of only the pixels included in the extracted object area by using the correction factors. As a result, since the number of pixels to be corrected becomes small, an amount of operations of the image correction process is also reduced.

Note that, in order to extract an object area from a biometric image, the correction factor calculating unit 21 and the correcting unit 22 may perform, for example, a process similar to the process for extracting an object area, which is explained with regard to the matching unit 23. When any of the correction factor calculating unit 21 and the correcting unit 22 extracts an object area, the matching unit 23 may not perform an object area extraction process again.

Depending on an image sensor, a luminance value of each pixel may be represented by a sum of a component proportional to an amount of light reaching the pixel and a bias component. In this case, for example, a luminance value of a pixel corresponding to a sensor element with the R filter and a luminance value of a pixel corresponding to a sensor element with the G filter are respectively represented in the following equations:

$$x'_R = \alpha \gamma_R x + b$$

$$x'_G = \alpha \gamma_G x + b \qquad (3)$$

where a and b each are constant number. In addition, x represents an amount of light reaching the pixel, and $x_R'$ and $x_G'$ respectively represent luminance values of pixels corresponding to a sensor element with the R filter and a luminance value of a pixel corresponding to a sensor element with the G filter. $\gamma_R$ and $\gamma_G$ are respectively a transmittance of the R filter for near-infrared light and a transmittance of the G filter for near-infrared light. Note that the equation (3) is also established for a luminance value of a pixel corresponding to a sensor element with the B filter.

In this case, the following equation is established between a luminance value of a pixel corresponding to a sensor element with the R filter or the B filter and a luminance value of a pixel adjacent to that pixel corresponding to a sensor element with the G filter:

$$x_{2,j} = \alpha \times x_{1,j} + \beta \qquad (4)$$

where $\alpha$ and $\beta$ are correction factors. $x_{1,j}$ is a luminance value of a pixel corresponding to a sensor element with the R filter or the B filter and $x_{2,j}$ is a luminance value of a pixel adjacent to that pixel corresponding to a sensor element with the G filter.

If the equation (4) is established for a plurality of pixels included in a biometric image, the equation (4) can be represented as the following equation.

$$\begin{pmatrix} x_{2,1} \\ x_{2,2} \\ x_{2,3} \\ \vdots \end{pmatrix} = \begin{pmatrix} x_{1,1} & 1 \\ x_{1,2} & 1 \\ x_{1,3} & 1 \\ \vdots & \vdots \end{pmatrix} \begin{pmatrix} \alpha \\ \beta \end{pmatrix} \quad (5)$$

Therefore, the correction factor calculating unit 21 can calculate the correction factors α and β according to the following equations for each of the R filter and the B filter.

$$\begin{pmatrix} \alpha \\ \beta \end{pmatrix} = B^+ A \quad (6)$$

$$B^+ = (B^T B)^{-1} B^T$$

$$\begin{pmatrix} x_{2,1} \\ x_{2,2} \\ x_{2,3} \\ \vdots \end{pmatrix} = A \quad \begin{pmatrix} x_{1,1} & 1 \\ x_{1,2} & 1 \\ x_{1,3} & 1 \\ \vdots & \vdots \end{pmatrix} = B$$

In this case, the correcting unit 22 may calculate the corrected luminance value according to the equation (4) for each of a pixel corresponding to a sensor element with the R filter and a pixel corresponding to a sensor element with the B filter. An absolute value of a difference between a luminance value of a pixel corresponding to a sensor element with the R filter or the B filter, the luminance value being corrected using the obtained corresponding correction factor α or β, and a luminance value of a pixel corresponding to a sensor element with the G filter becomes less than an absolute value of a difference between the luminance values before the correction.

Note that an image sensor included in the biometric information image capturing apparatus 4 may include color filters arranged according to an array pattern other than the Bayer array. Also in this case, the correction factor calculating unit 21 may set, as $x_{2,i}$, a luminance value of a pixel on an image corresponding to a sensor element with a filter corresponding to any color among a plurality of color filters, and set, as $x_{1,i}$, a luminance value of a pixel corresponding to a sensor element with a filter corresponding to other color. Then the correction factor calculating unit 21 may calculate the correction factor according to the equation (2) or equation (6). Furthermore, although it is preferable that a distance between a pixel corresponding to $x_{1,i}$ and a pixel corresponding to $x_{2,i}$ to be small to avoid effects due to a structure of the captured object, those pixels may not be adjacent to each other.

In addition, in such a case that a user does not properly place a body part including biometric information to the biometric information image capturing apparatus 4, a characteristic portion of the biometric information would not be properly extracted from the biometric image and, as a result, the biometric authentication apparatus may fail in the biometric authentication. In such a case, the biometric authentication apparatus may cause the biometric information image capturing apparatus 4 to capture the biometric information of the user again to regenerate the biometric image, and perform the biometric authentication process again using the regenerated biometric image. Accordingly, the storage unit 6 may temporarily store the calculated correction factors for a predetermined period (for example, five to ten minutes) and, with respect to those biometric images generated while the storage unit stores the correction factor, the processing unit 7 may correct the biometric images using the stored correction factors. Thereby, it is possible for the processing unit 7 to reduce an amount of operations since the correction factor is not required to be calculated every time a biometric image is generated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image correction apparatus comprising:
  a processor configured to: calculate a correction factor such that a distance between a corrected value obtained by correcting, using the correction factor, a luminance value of a first pixel on an image corresponding to a sensor element with a first filter in an image sensor included in an image capturing device which generates the image, the first filter having a first transmittance characteristic, and a luminance value of a second pixel on the image corresponding to a sensor element with a second filter in the image sensor, the second filter having a second transmittance characteristic different from the first transmittance characteristic, becomes smaller than a distance between the luminance value of the first pixel and the luminance value of the second pixel; and
  generate a corrected image by correcting the luminance value of the first pixel using the correction factor, wherein
  the calculation of the correction factor calculates the correction factor which is common to each first pixel of a plurality of sets of the first pixel and the second pixel according to a relational equation between the luminance values of the first pixel and the second pixel, such that a total sum of differences between the corrected value and the luminance value of the second pixel in each of the plurality of sets is decreased, the first pixel and the second pixel in each of the plurality of sets being placed in a certain positional relationship.

2. The image correction apparatus according to claim 1, wherein the calculation of the correction factor includes extracting an object area where an object is captured on the image to calculate the correction factor based on the first pixel and the second pixel included in the object area among a plurality of the first pixels and a plurality of the second pixels in the image.

3. The image correction apparatus according to claim 1, wherein
  each of the sensor elements of the image sensor includes any one of the first filter through which at least red light and near-infrared light are transmitted, the second filter through which at least green light and near-infrared light are transmitted, and a third filter through which at least blue light and near-infrared light are transmitted, the calculation of the correction factor includes calculating a second correction factor such that a distance between a corrected value obtained by correcting, using the second correction factor, a luminance value of a third pixel on the image corresponding to a sensor element in the image sensor which detected near-infrared light transmitted through the third filter, and the luminance value of the second pixel corresponding to the sensor element which detected near-infrared light transmitted through the second filter becomes smaller than a distance between the luminance value of the third pixel and the luminance value of the second pixel, and the generation of the corrected image includes generating the corrected image by correcting the luminance value of the first pixel using the correction factor and correcting the luminance value of the third pixel using the second correction factor.

4. The image correction apparatus according to claim 3, wherein the calculation of the correction factor includes calculating the correction factor using the luminance value of the first pixel and the luminance value of the second pixel, the first pixel and the second pixel being adjacent to each other.

5. A biometric authentication apparatus comprising:
a storage device which stores registered matching data representing a feature of biometric information of a registered user;
a biometric information image capturing apparatus which includes an image sensor with a sensor element with a first filter having a first transmittance characteristic and a senor element with a second filter having a second transmittance characteristic different from the first transmittance characteristic, and generates a biometric image on which a body part including biometric information of a user is captured by the image sensor; and
a processor configured to: calculate a correction factor such that a distance between a corrected value obtained by correcting, using the correction factor, a luminance value of a first pixel on the biometric image corresponding to the sensor element with the first filter and a luminance value of a second pixel on the biometric image corresponding to the sensor element with the second filter becomes smaller than a distance between the luminance value of the first pixel and the luminance value of the second pixel;
correct the biometric image by correcting the luminance value of the first pixel using the correction factor;
generate matching data representing a feature of the biometric information of the user from the corrected biometric image; and
determine whether or not to authenticate the user as the registered user by matching the matching data and the registered matching data, wherein
the calculation of the correction factor calculates the correction factor which is common to each first pixel of a plurality of sets of the first pixel and the second pixel according to a relational equation between the luminance values of the first pixel and the second pixel, such that a total sum of differences between the corrected value and the luminance value of the second pixel in each of the plurality of sets is decreased, the first pixel and the second pixel in each of the plurality of sets being placed in a certain positional relationship.

6. The biometric authentication apparatus according to claim 5, wherein the calculation of the correction factor includes extracting an object area where the body part is captured on the image to calculate the correction factor based on the first pixel and the second pixel included in the object area among a plurality of the first pixels and a plurality of the second pixels in the image.

7. The biometric authentication apparatus according to claim 5, wherein
each of the sensor elements of the image sensor includes any one of the first filter through which at least red light and near-infrared light are transmitted, the second filter through which at least green light and near-infrared light are transmitted, and a third filter through which at least blue light and near-infrared light are transmitted,
the calculation of the correction factor includes calculating a second correction factor such that a distance between a corrected value obtained by correcting, using the second correction factor, a luminance value of a third pixel on the image corresponding to a sensor element in the image sensor which detected near-infrared light transmitted through the third filter, and the luminance value of the second pixel corresponding to the sensor element which detected near-infrared light transmitted through the second filter becomes smaller than a distance between the luminance value of the third pixel and the luminance value of the second pixel, and the generation of the corrected image includes generating the corrected image by correcting the luminance value of the first pixel using the correction factor and correcting the luminance value of the third pixel using the second correction factor.

8. The biometric authentication apparatus according to claim 7, wherein the calculation of the correction factor includes calculating the correction factor using the luminance value of the first pixel and the luminance value of the second pixel, the first pixel and the second pixel being adjacent to each other.

9. An image correction method comprising:
calculating a correction factor such that a distance between a corrected value obtained by correcting, using the correction factor, a luminance value of a first pixel on an image corresponding to a sensor element with a first filter in an image sensor included in an image capturing unit which generates the image, the first filter having a first transmittance characteristic and a luminance value of a second pixel on the image corresponding to a sensor element with a second filter in the image sensor, the second filter having a second transmittance characteristic different from the first transmittance characteristic, becomes smaller than a distance between the luminance value of the first pixel and the luminance value of the second pixel; and
generating a corrected image by correcting the luminance value of the first pixel using the correction factor, wherein
the calculation of the correction factor calculates the correction factor which is common to each first pixel of a plurality of sets of the first pixel and the second pixel according to a relational equation between the luminance values of the first pixel and the second pixel, such that a total sum of differences between the corrected value and the luminance value of the second pixel in each of the plurality of sets is decreased, the first pixel and the second pixel in each of the plurality of sets being placed in a certain positional relationship.

10. The image correction method according to claim 9, wherein the calculating the correction factor extracts an object area where an object is captured on the image to calculate the correction factor based on the first pixel and the second pixel included in the object area among a plurality of the first pixels and a plurality of the second pixels in the image.

11. The image correction method according to claim 9, wherein
   each of the sensor elements of the image sensor includes any one of the first filter through which at least red light and near-infrared light are transmitted, the second filter through which at least green light and near-infrared light are transmitted, and a third filter through which at least blue light and near-infrared light are transmitted,
   the calculating the correction factor calculates a second correction factor such that a distance between a corrected value obtained by correcting, using the second correction factor, a luminance value of a third pixel on the image corresponding to a sensor element in the image sensor which detected near-infrared light transmitted through the third filter, and the luminance value of the second pixel corresponding to the sensor element which detected near-infrared light transmitted through the second filter becomes smaller than a distance between the luminance value of the third pixel and the luminance value of the second pixel, and
   the generating the corrected image generates the corrected image by correcting the luminance value of the first pixel using the correction factor and correcting the luminance value of the third pixel using the second correction factor.

12. The image correction method according to claim 11, wherein the calculating the correction factor calculates the correction factor using the luminance value of the first pixel and the luminance value of the second pixel, the first pixel and the second pixel being adjacent to each other.

* * * * *